United States Patent [19]

Leone

[11] Patent Number: 5,035,816

[45] Date of Patent: Jul. 30, 1991

[54] PROCESS FOR PREPARING SUPERALKALINIZED DETERGENT-DISPERSANT ADDITIVES FOR LUBRICATING OILS

[75] Inventor: Savino Leone, Tassin Dela Demi-Lune, France

[73] Assignee: Orogil, France

[21] Appl. No.: 247,016

[22] Filed: Sep. 20, 1988

[30] Foreign Application Priority Data

Dec. 23, 1987 [FR] France .................... 87 18014

[51] Int. Cl.$^5$ .................................. C10M 135/06
[52] U.S. Cl. ..................... 252/40.5; 252/39; 252/40
[58] Field of Search ............. 252/33, 33.2, 38, 39, 252/40, 40.5

[56] References Cited

U.S. PATENT DOCUMENTS

| | | | |
|---|---|---|---|
| 3,036,971 | 5/1962 | Otto | 252/42.7 |
| 3,372,116 | 3/1968 | Meinhardt | 252/36 |
| 3,410,798 | 11/1968 | Cohen | 252/37.2 |
| 3,437,595 | 4/1969 | Coupland | 252/42.7 |
| 3,493,516 | 2/1970 | Allphin | 252/33.3 |
| 3,595,791 | 7/1971 | Cohen | 252/33.6 |
| 4,751,010 | 6/1988 | Leone | 252/33 |

FOREIGN PATENT DOCUMENTS

| | | |
|---|---|---|
| 0013731 | 3/1987 | France . |
| 13731/85 | 3/1987 | France . |
| 127396 | 7/1985 | Japan . |

*Primary Examiner*—Jacqueline V. Howard

[57] ABSTRACT

A process for preparing alkylsalicylate superalkalinized detergent-dispersant lubricating oil additives: (a) by the acid catalyzed neutralization of $C_{12}$–$C_{30}$ alkylphenol with alkaline earth base in the presence of an azeotropic solvent for the water of reaction; (b) by the carboxylation of the first product with $CO_2$ to partially convert the alkylphenate to alkylsalicylate; and (c) by sulfurization-superalkalinization of the product in the presence of sulfur, alkaline earth base, azeotropic solvent and added $CO_2$.

9 Claims, No Drawings

PROCESS FOR PREPARING SUPERALKALINIZED DETERGENT-DISPERSANT ADDITIVES FOR LUBRICATING OILS

The object of the present invention is a process for preparing detergent-dispersant additives for lubricating oils, additives based on sulfurized and superalkalinized alkylphenates-alkylsalicylates.

The Applicant has described related additives in his French patent application 85/13731 published under U.S. Pat. No. 2,587,353 on Mar. 20, 1987. These were obtained by:

1. neutralization of an alkylphenyl by means of an alkaline earth base in the presence of a "carrier" alcohol such as an alkylene glycol and an azeotropic solvent forming an azeotrope with the reaction water;
2. total elimination of the carrier alcohol and the azeotrope;
3. carboxylation of the alkylphenate formed into alkylsalicylate;
4. sulfurization-superalkalinization by sulfur in the presence of an alkaline earth base, an alkylene glycol and an azeotropic solvent and then carbonation;
5. elimination of the alkylene glycol and the azeotropic solvent;
6. filtration.

It is known how to prepare detergent additives by carboxylation of a potassium alkylphenate, exchange with calcium salt, then sulfurization of the mixture of alkylphenate and alkylsalicylate of calcium with sulfur in the presence of lime, a carboxylic acid, an alkylene or alkyl ether of alkylene glycol (U.S. Pat. No. 3,410,798; U.S. Pat. No. 3,437,595; and U.S. Pat. No. 3,595,791).

The Applicant has now found a process carried out in the presence of acid which makes it possible to increase the rate of conversion of the alkylphenol into alkylsalicylate of alkaline earth metal, decrease the $CO_2$ pressure in the carboxylation stage, and reduce the quantity of calcium carbonate formed, which improves the rate of filtration in the last stage and the viscosity of the final product.

Furthermore, this process does not require distillation of the solvent before carboxylation.

The process for preparing the alkylsalicylate-containing superalkalinized detergent-dispersant additives according to the invention is characterized by the following stages:

a. In a first stage, the neutralization of an alkylphenol carrying one or more $C_8$-$C_{30}$, preferably $C_{12}$-$C_{30}$, alkyl substituents, by means of an alkaline earth base in the presence of at least one acid selected among the $C_1$-$C_{18}$ aliphatic carboxylic acids, benzoic acid, benzoic anhydride or the mineral acids and an azeotropic solvent forming an azeotrope with the reaction water, selected among (1) the aromatic hydrocarbons, (2) the aliphatic hydrocarbons, and (3) the monoalcohols with a boiling point greater than 120° C. and preferably greater than 150° C., said neutralization operation being carried out at a temperature at least equal to that of the formation of the azeotrope, the quantities of reagents used corresponding to the following molar ratios:

alkaline earth base/alkylphenol ranging from 0.1 to 2 and preferably from 0.3 to 0.7,
acid/alkylphenol ranging from 0.01 to 1 and preferably from 0.05 to 0.2;
optionally, distillation of the azeotropic solvent, to form a first product;

b. in a second stage, the carboxylation of said first product to convert the alkylphenate formed in said first product into alkylsalicylate by means of carbon dioxide at a temperature of 100° to 185° C. (preferably 140°–180° C.) under a pressure which can range from atmospheric pressure to 15 bars (preferably on the order of 5 bars) for at least 3 hours, optionally in the presence of a dilution oil or an aromatic solvent, the quantity of $CO_2$ corresponding to that necessary to obtain conversion of the initial alkylphenol into alkylsalicylate expressed as acid between approximately 5 and 50%, and form a second product;

c. in a third stage, the sulfurization of a said second product mixture obtained with elemental sulfur in the presence of an alkaline earth base, an alkylene glycol and an azeotropic solvent selected among (1) the aromatic hydrocarbons, (2) the aliphatic hydrocarbons, and (3) the monoalcohols with a boiling point above 120° C. and preferably above 150° C., at a temperature on the order of 140° to 230° C., the quantities of reagents used corresponding to the following molar ratios:

sulfur/initial alkylphenol ranging from 0.7 to 1.5, and preferably from 0.7 to 1.3,
total alkaline earth base/initial alkylphenol of at least 1.7 and preferably ranging from 1.7 to 2,
superalkalinization alkaline earth base/glycol alkylene ranging from 1 to 1.6, and then carbonation of the said mixture with carbon dioxide at a temperature of 100°–185° C. and under a pressure close to atmospheric pressure, the quantity of $CO_2$ used lying between that which can be completely absorbed by the reaction medium and a 30% excess of this quantity;

d. elimination of the alkylene glycol and the azeotropic solvent after addition of dilution oil; and
e. filtration to eliminate the sediments.

Among the alkaline earth bases that can be used to carry out the various stages of preparation of the additives that are the object of the invention, one can cite the oxides or hydroxides of calcium, barium or strontium and especially those of calcium.

Among the acids that can be used in the neutralization stage one can cite formic, acetic, propionic, hydrochloric, and nitric acid.

The $C_1$-$C_3$ aliphatic carboxylic acids, and especially their mixtures, for example, the formic acid-acetic acid mixture according to an acetic acid/formic acid ratio which can range from 0.01/1 to 5/1, preferably from 0.25/1 to 2/1, and especially on the order of 1/1 are preferred.

Among the azeotropic solvents that can be used, one can cite xylene, toluene, cyclohexane, 2-ethylhexanol, the oxo alcohols, decyl alcohol, tridecyl alcohol, 2-butoxyethanol, 2-butoxypropanol, methyl ether of propylene glycol.

The first stage, that is, the stage of neutralization of the alkylphenol, is advantageously carried out at a pressure close to atmospheric pressure, at a temperature at least equal to that for the formation of the azeotrope of water and the azeotropic solvent; when the azeotropic solvent chosen is 2-ethylhexanol, a temperature on the order of 160°–170° C. is preferred; when it is cyclohexane, a temperature of 70°–80° C. is well suited; generally, the neutralization stage is carried out at a temperature on the order of 50° to 200° C.; the operation lasts approximately 2 to 5 hours.

The quantity of azeotropic solvent used in this stage corresponds to that necessary to obtain a fluid medium, that is, of a viscosity lower than approximately $30 \times 10^{-6}$ m$^2$/s under the reaction conditions.

Among the dilution oils that can be used in the second stage, one can cite preferably the paraffin oils such as the 100 Neutral oil; the naphthenic oils or mixed oils may also be suitable.

The second stage, the carboxylation stage, is quite specially carried out under a pressure ranging from atmospheric pressure to 15 bars, preferably on the order of 5 bars; this operation lasts at least 3 hours and generally 5 to 15 hours. It is noted that the conversion of the phenate into salicylate is not total; a conversion of the initial alkylphenol into alkylsalicylate expressed in acid of 20 to 45% is generally sufficient to obtain high-performance products.

The third stage, the sulfurization-superalkalinization stage, is preferably carried out at a temperature on the order of 140° to 160° C. for approximately 3 to 6 hours; if desired, this stage can be carried out in the presence of a catalyst such as halide ions, COOH or amine groups in a quantity that can range up to 0.1 moles of halide ion, COOH or amine groups per initial alkylphenol mole.

One embodiment of this third stage consists of splitting the sulfurization and the superalkalinization into two stages:

a sulfurization stage for the alkylphenate-alkylsalicylate mixture obtained with elemental sulfur in the presence of an alkali metal hydroxide as catalyst at a temperature between 140° and 230° C., preferably between 140° and 160° C., and an azeotropic solvent forming an azeotrope with the reaction water selected among (1) the aliphatic hydrocarbons, (2) the aromatic hydrocarbons, and (3) monoalcohols with a boiling point above 120° C. and preferably above 150° C., the quantities of reagents used corresponding to the following molar ratios:

sulfur/initial alkylphenol ranging from 0.7 to 1.5, preferably from 0.7 to 1.3, alkali metal hydroxide/initial alkylphenol ranging from 0.01 to 0.03;

a stage of superalkalinization of the sulfurized alkylphenate-sulfurized alkylsalicylate mixture by addition of an alkaline earth base at a temperature from 50° to 80° C. in the presence of an alkylene glycol and an azeotropic solvent forming an azeotrope with the reaction water selected from (1) the aliphatic hydrocarbons, (2) the aromatic hydrocarbons, and (3) monoalcohols with a boiling point above 120° C. and preferably above 150° C., the quantities of reagents used corresponding to the following molar ratios:

total alkaline earth base/initial alkylphenol of at least 1.7 and preferably from 1.7 to 2, superalkalinization alkaline earth base/alkylene glycol ranging from 1 to 1.6, and then, carbonation of the medium obtained with carbon dioxide at a temperature of 100°–185° C., preferably from 145° C. to 165° C., under a pressure close to atmospheric pressure, the quantity of CO$_2$ used being between that which can be completely absorbed by the reaction medium and a 30% excess of this quantity.

By "total alkaline earth base" one understands the total quantity of alkaline earth base(s) used to carry out all these stages. By "superalkalinization alkaline earth base" one understands the base used in the sulfurization-superalkalinization stage.

According to one variant of reaction, the sulfurization is preferably carried out in the presence of potash or soda as catalyst. This operation generally lasts from 3 to 6 hours. The quantity of azeotropic solvent used corresponds to the quantity necessary to obtain a fluid medium, that is, of a viscosity below approximately $30 \times 10^{-6}$ m$^2$/s under the reaction conditions.

The carbonation proper is advantageously carried out at a temperature of 145°–180° C. under a pressure of approximately $930 \times 10^2$ to $1010 \times 10^2$ Pa.

After carbonation, dilution oil is introduced in a quantity such that the quantity of oil contained in the final product represents from 25 to 65 wt % and preferably 30 to 50 wt % of said product.

The additives obtained according to the process of the invention exhibit a high basicity. The TBN (total base number) of the additives based on calcium salts, for example, easily reach 250 to 300.

The quantity of additive to be used to improve the detergent-dispersant properties of lubricating oils is a function of the future use of said oils.

Thus, for an oil for gasoline motors, the quantity of additive to be added generally lies between 1 and 3 wt %. For a diesel motor oil it generally lies between 1.5 and 5 wt %. For a marine motor oil it generally lies between 10 and 30%.

The lubricating oils that can thus be improved can be selected among very varied lubricating oils such as lubricating oils with a naphthenic base, with a paraffin base and with a mixed base, other hydrocarbon lubricants, for example, lubricating oils derived from oil products, and synthetic oils, for example, alkylene polymers, polymers of the alkylene oxide type and their derivatives, including alkylene oxide polymers prepared by polymerizing alkylene oxide in the presence of water or alcohols, for example, ethyl alcohol, the esters of dicarboxylic acids, liquid esters of phosphoric acids, alkylbenzenes and dialkylbenzenes, polyphenyls, alkyl biphenyl ethers, polymers of silicon.

Additional additives may also be present in said lubricating oils besides detergents-dispersants obtained according to the process of the invention. One can cite, for example, antioxidizing additives, anticorrosion additives, ash-free dispersant additives.

The following examples are given as indications and cannot be considered as a limit on the scope and the spirit of the invention.

EXAMPLE 1

Neutralization

To a mixture consisting of 2620 g of para-dodecylphenol (DDP) (10 moles) and 500 g of 2-ethylhexanol (2-EH), one adds 231 g of lime Ca(OH)$_2$ with 52% calcium (or 3 moles).

The medium is brought to 80° C., and then one introduces over 1 h 15 min a mixture of 24 g of acetic acid, 18.7 g of formic acid, and 500 g of 2-ethylhexanol.

The reaction medium is heated at the base to 145° C. The distillation of the water - ethyl - 2-hexanol azeotrope starts approximately 30 min after the start of the addition of the mixture and continues for approximately 2 hours.

The reaction is left to take place for 4 hours to completely dehydrate the medium.

One recovers 107 g of distillate $D_1$ consisting entirely of water.

At the end of the reaction, the temperature at the base reaches 195° C.

The product obtained is cooled to approximately 150° C., and then 100 g of 100 Neutral oil is added.

The remaining 2-ethylhexanol is eliminated by distillation at 195° C. under 2666 Pa.

One recovers 3734 g of product solution.

Carboxylation

One transfers 1803 g of the solution obtained (which corresponds to a quantity of initial DDP of 4.8 moles) into a 3.6-L autoclave. The mixture is heated to 165° C. while scavenging the reactor with nitrogen for 5 to 10 min, and then purging it with 10 to 15 g of $CO_2$.

One starts to introduce the $CO_2$, and one increases the pressure over 5 min to 5 bars.

The introduction of the $CO_2$ lasts 7 hours at 180° C. The quantity of $CO_2$ consumed is 66 g.

One then recovers 1862 g of a mixture exhibiting a viscosity of $27.3 \times 10^{-6}$ m$^2$/s at 100° C. and having the following characteristics:

calcium: 3.1

% $CO_2$:0.34 (representative of the ratio of calcium carbonate), which corresponds to a conversion of the initial alkylphenol into alkylsalicylate expressed in alkylsalicylic acid of 24.4%. Hereinafter "conversion" refers to this conversion to alkylsalicylate.

Sulfurization-Superalkalinization

One transfers 1426 g of the solution obtained into a 5-L flask equipped with a stirring system, a column, a coolant, a receiver and potash traps.

Under stirring one introduces at 65° C.:
400 g of 2-ethylhexanol
374 g of Ca(OH)$_2$ with 52% Ca
98.5 g of sulfur.

The charged apparatus is placed under a slight vacuum ($960 \times 10^2$ Pa) and the heating is increased.

When the temperature reaches 90° C., one introduces over 20 min 125 g of ethylene glycol while letting the temperature rise.

The distillation and the bubbling of $H_2S$ in the traps start around 150° C.

After 15 min at 155° C. one again adds 125 g of glycol over 15 min. The temperature increases to 165° C. where one adds 300 g of 2-ethylhexanol, and then the product is left at 165° C. for one hour.

The content of the flask is then carbonated by bubbling $CO_2$ (65 L/hour) for one hour at 165° C.

One hundred twenty-one (121) g of $CO_2$ is thus fixed the product with a carbonation yield of 78%.

The mixture is then brought to 195° C. under $960 \times 10^2$ Pa; some of the 2-ethylhexanol distils.

One introduces 405 g of 100 Neutral oil and then 0.8 g of antifoam and the vacuum is gradually increased.

The distillation is practically terminated when the temperature reaches 195°–200° C. under $27 \times 10^2$–$40 \times 10^2$ Pa.

One obtains 2430 g of product whose characteristics are as follows:

| | |
|---|---|
| crude sediments % | 1.2 |
| Ca total % | 9.86 |
| S % | 2.64 |
| TBN | 280 |
| Viscosity | $187 \times 10^{-6}$ m$^2$/s |

EXAMPLES 2-6

The products whose characteristics appear in Tables IVa and IVb were obtained by carrying out:
the neutralization stage under the same conditions of temperature and pressure as Example 1, using the quantities of reagents shown in Tables Ia and Ib;
the carboxylation stage under the conditions and with the quantities of reagents shown in Tables IIa and IIb;
the sulfurization-superalkalinization stage under conditions identical to those of Example 1 (Tables IIIa and IIIb).

EXAMPLE 7

Neutralization

The neutralization stage described in Example 1 is carried out under the same conditions of temperature and pressure and using the following reagents:
a mixture of 1843 g of paradodecylphenol (7 moles) and 790 g of a linear alkylphenol with a molecular weight of approximately 430 (1.84 mole);
250 g of lime
450+450 g of 2-ethylhexanol
32.3 g of acetic acid
25 g of formic acid
887 g of oil.

One recovers 3671 g of product solution.

Carboxylation

The carboxylation operation is carried out under the conditions and with the quantities of reagents indicated in Table IIb.

Sulfurization-Superalkalinization

This operation is carried out as in Example 1 with the quantities of reagents shown in Table IIIb. The product obtained exhibits the characteristics given in Table IVb.

EXAMPLES 8 AND 9

One repeats the operations described in Example 7 using the conditions and the quantities of reagents shown in Tables Ib to IIIb.

The characteristics of the products obtained are shown in Table IVb.

EXAMPLE 10

One repeats all the operations described in Example 1 replacing lime with CaO, the sulfurization-superalkalinization operation being carried out with lime.

The quantities of reagents used, the operating conditions and the characteristics of the final product are shown in Tables Ib, IIb, IIIb and IVb.

REFERENCE EXAMPLES

One repeats the neutralization operation described in Examples 1 and 2 (Ca/DDP molar ratio=0.3) replacing the mixture of formic acid and acetic acid by 113 g of glycol, which corresponds to a glycol/DDP molar ratio of 0.18.

The conversion in the carboxylation stage is 19.5% instead of 24.4 or 23.9%.

When the quantity of glycol is 310 g (glycol/DDP molar ratio=0.5), the conversion in the carboxylation stage is 18%.

One repeats the neutralization operation described in Example 5 (Ca/DDP molar ratio=0.4) replacing the formic acid and acetic acid mixture by 211 g of glycol (glycol/DDP molar ratio: 0.34); the conversion in the carboxylation stage is 21.6% instead of 32.8%.

One repeats the neutralization operation described in Example 3 or 4 (Ca/DDP molar ratio=0.5) replacing the mixture of formic acid and acetic acid by 113 g of glycol (glycol/DDP molar ratio=0.18). The conversion in the carboxylation stage is 24.6% instead of 32.9 and 35.9%.

When the quantity of glycol is 211 g (glycol/DDP=0.34), the conversion in the carboxylation stage is 22.7%.

TABLE Ia

| | (neutralization) | | | | |
|---|---|---|---|---|---|
| EXAMPLES | 1 | 2 | 3 | 4 | 5 |
| DDP g | 2620 | 2620 | 2620 | 2623 | 2620 |
| AP g | — | — | — | — | — |
| 2-EH g | 1000 | 1000 | 1000 | 1000 | 1000 |
| Lime | 231 | 231 | 392 | 383 | 307 |
| CaO (g) | — | — | — | — | — |
| AA g | 24 | 36 | 36 | 24 | 30 |
| FA g | 18.7 | 27.9 | 27.6 | 18.4 | 23 |
| Oil (g) | 1000 | 1000 | 1000 | 1000 | 1000 |
| Ca/DDP + (AP) Mol. | 0.3 | 0.3 | 0.5 | 0.5 | 0.4 |
| AA + FA/DDP + (AP) Mol. | 0.08 | 0.12 | 0.12 | 0.08 | 0.1 |
| Distillate $D_1$ g | 107 | 112 | 156 | 164 | 143 |
| Product Obtained g | 3734 | 3673 | 3919 | 3942 | 3752 |

AP: alkylphenol
AA: acetic acid
FA: formic acid

TABLE Ib

| | (neutralization) | | | | |
|---|---|---|---|---|---|
| EXAMPLES | 6 | 7 | 8 | 9 | 10 |
| DDP g | 2621 | 1843 | 1844 | 1846 | 2625 |
| AP g | — | 790 | 789 | 790 | — |
| 2-EH g | 1000 | 900 | 900 | 900 | 1000 |
| Lime | 153 | 205 | 348 | 205 | — |
| CaO (g) | — | — | — | — | 168 |
| AA g | 30 | 32.3 | 32 | 21.3 | 24 |
| FA g | 23 | 25 | 25 | 16.4 | 18.4 |
| Oil (g) | 1000 | 887 | 887 | 887 | 1000 |
| Ca/DDP + (AP) Mol. | 0.2 | 0.3 | 0.5 | 0.3 | 0.3 |
| AA + FA/DDP + (AP) Mol. | 0.1 | 0.12 | 0.12 | 0.08 | 0.08 |
| Distillate $D_1$ g | 77 | 95 | 133 | 90 | 91 |
| Product Obtained g | 3572 | 3671 | 3829 | 3633 | 3694 |

AP: alkylphenol
AA: acetic acid
FA: formic acid

TABLE IIa

| | (carboxylation) | | | | |
|---|---|---|---|---|---|
| EXAMPLES | 1 | 2 | 3 | 4 | 5 |
| Product to Carboxylate g | 1803 | 1760 | 1824 | 1807 | 1765 |
| $CO_2$ Consumed g | 66 | 56.9 | 87.7 | 98.8 | 80 |
| Temperature °C. | 180 | 180 | 180 | 180 | 180 |
| Pressure of $CO_2$ Bars | 5 | 5 | 5 | 5 | 5 |
| Duration h | 7 | 7 | 7 | 7 | 7 |
| Product Obtained g | 1862 | 1804 | 1905 | 1996 | 1834 |
| RC of DDP (+ AP) % | 24.4 | 23.9 | 32.9 | 35.9 | 32.8 |
| % $CO_2$ | 0.34 | 0.45 | 0.82 | 0.95 | 0.57 |
| Viscosity at 100° C. $m^2/s\ 10^{-6}$ | 27.3 | 28 | 63 | — | — |

RC = Conversion of alkylphenol into salicylic acid determined by potentiometric determination after acidification of product.
% $CO_2$ = $CO_2$ content of the product representative of the calcium carbonate ratio.

TABLE IIb

| | (carboxylation) | | | | |
|---|---|---|---|---|---|
| EXAMPLES | 6 | 7 | 8 | 9 | 10 |
| Product to Carboxylate g | 1821 | 1755 | 1871 | 1785 | 1850 |
| $CO_2$ Consumed g | 63.4 | 55 | 78.2 | 58.2 | 76.4 |
| Temperature °C. | 180 | 180 | 180 | 180 | 180 |
| Pressure of $CO_2$ Bars | 5 | 5 | 5 | 5 | 5 |
| Duration h | 7 | 7 | 7 | 7 | 7 |
| Product Obtained g | 1857 | 1803 | 1953 | 1844 | 1902 |
| RC of DDP (+ AP) % | 16.5 | 22.6 | 30.8 | 24.4 | 25.4 |
| % $CO_2$ | 0.32 | 0.38 | 0.84 | 0.31 | 0.28 |
| Viscosity at 100° C. $m^2/s\ 10^{-6}$ | — | 19.8 | 35 | 21.7 | — |

RC = Conversion of alkylphenol into salicylic acid determined by potentiometric determination after acidification of product.
% $CO_2$ = $CO_2$ content of the product representative of the calcium carbonate ratio.

TABLE IIIa

| | (sulfurization-superalkalinization) | | | | |
|---|---|---|---|---|---|
| EXAMPLES | 1 | 2 | 3 | 4 | 5 |
| CHARGES | | | | | |
| Sulfurization-superalkalinization Product g | 1426 | 1395 | 1516 | 1526 | 1444 |
| Sulfur g | 98.5 | 99 | 88 | 84 | 88 |
| Lime g | 374 | 375 | 317 | 318 | 346 |
| Glycol g | 250 | 250 | 250 | 250 | 250 |
| 2-EH g | 700 | 700 | 700 | 700 | 700 |
| Oil g | 405 | 405 | 405 | 405 | 405 |
| $CO_2$ charged g | 156 | 155 | 171 | 150 | 159 |
| T. Lime/DDP + (AP) Mol. | 1.67 | 1.68 | 1.68 | 1.67 | 1.67 |
| S. Lime/S. Glycol Mol. | 1.25 | 1.25 | 1.06 | 1.06 | 1.16 |
| S/DDP + (AP) Mol. | 0.83 | 0.84 | 0.75 | 0.71 | 0.75 |
| Addition Temp. °C. (1st Glycol Charge) | 87 | 87 | 90 | 85 | 88 |
| Sulfurization Time | 2H45 | 3H15 | 3H20 | 3H00 | 2H45 |
| Carbonation Temp. (°C.) | 165 | 165 | 165 | 165 | 165 |
| Carbonation Time (min) | 75 | 70 | 80 | 70 | 70 |

T. Lime = Total lime
S. Lime = Sulfurization lime
S. Glycol = Superalkalinization glycol

TABLE IIIb

| | (sulfurization-superalkalinization) | | | | |
|---|---|---|---|---|---|
| EXAMPLES | 6 | 7 | 8 | 9 | 10 |
| CHARGES | | | | | |
| Sulfurization-superalkalinization Product g | 1350 | 1578 | 1668 | 1565 | 1403 |
| Sulfur g | 103 | 101 | 90 | 99 | 98 |
| Lime g | 402 | 374 | 317 | 374 | 375 |
| Glycol g | 250 | 250 | 250 | 250 | 250 |
| 2-EH g | 700 | 700 | 700 | 700 | 700 |
| Oil g | 405 | 276 | 405 | 276 | 405 |
| $CO_2$ charged g | 155 | 158 | 145 | 161 | 181 |
| T. Lime/DDP + (AP) Mol. | 1.67 | 1.58 | 1.59 | 1.58 | 1.67 |
| S. Lime/S. Glycol Mol. | 1.35 | 1.25 | 1.06 | 1.25 | 125 |
| S/DDP + (AP) Mol | 0.92 | 0.80 | 0.71 | 0.79 | 0.80 |
| Addition Temp. °C. (1st Glycol Charge) | 83 | 90 | 87 | 90 | 91 |
| Sulfurization Time | 2H50 | 3H15 | 4H20 | 3H10 | 3H15 |
| Carbonation Temp. (°C.) | 165 | 165 | 165 | 165 | 165 |
| Carbonation Time (min) | 78 | 65 | 60 | 75 | 70 |

T. Lime = Total lime
S. Lime = Sulfurization lime
S. Glycol = Superalkalinization glycol

TABLE IVa (characteristics of the final product)

| EXAMPLES | 1 | 2 | 3 | 4 | 5 |
|---|---|---|---|---|---|
| % Crude Sediments | 1.2 | 0.8 | 2.6 | 0.8 | 0.8 |
| Total Ca % | 10.1 | 10.6 | 10.3 | 10 | 9.9 |
| S % | 2.64 | 2.8 | 2.4 | 2.3 | 2.42 |
| Viscosity $m^2/s$ $10^{-6}$ | 187 | 350 | 308 | 363 | 486 |
| Filtration $kg/h/m^2$ | 245 | 217 | 50 | 203 | 212 |
| TBN | 282 | 295 | 288 | — | — |

TABLE IVb (characteristics of the final product)

| EXAMPLES | 6 | 7 | 8 | 9 | 10 |
|---|---|---|---|---|---|
| % Crude Sediments | 0.8 | 1.3 | 2.6 | 1.2 | 0.6 |
| Total Ca % | 10.1 | 10.2 | 9.7 | 10.2 | 10.35 |
| S % | 2.31 | 2.65 | 2.7 | 2.7 | 2.7 |
| Viscosity $m^2s/$ $10^{-6}$ | 410 | 177 | 116 | 132 | 337 |
| Filtration $kg/h/m^2$ | 234 | 135 | 128 | 83 | 277 |
| TBN | — | 285 | 272 | 286 | 230 |

What is claimed is:

1. Process for preparing alkylsalicylate-containing superalkalinized detergent-dispersant additives comprising the following stages:
   a. In a first stage, neutralizing an alkylphenol by means of an alkaline earth base in the presence of at least one acid selected from the group consisting of the $C_1$-$C_{18}$ aliphatic carboxylic acids, benzoic acid, benzoic anhydride or the mineral acids, wherein water is formed, and an azeotropic solvent forming an azeotrope with said water, said phenol having one or more $C_8$-$C_{30}$ alkyl substituents, and said azeotropic solvent selected from the group consisting of (1) the aromatic hydrocarbons (2) the aliphatic hydrocarbons, and (3) the monoalcohols with a boiling point above 120° C., said neutralization being carried out at a temperature at least equal to that of the formation of said azeotrope, the quantities of reagents used corresponding to the following molar ratios:
   Alkaline earth base/alkylphenol ranging from 0.1 to 2
   Acid/alkylphenol ranging from 0.01 to 1; and distillation of the azeotropic solvent to form a first product comprising alkylphenate;
   b. in a second stage, carboxylating said first stage product to convert the alkylphenate formed in said first stage into alkylsalicylate by means of carbon dioxide at a temperature from 100°-185° C. under a pressure from atmospheric pressure to 15 bars for at least 3 hours in the presence of a dilution oil or an aromatic solvent, the quantity of $CO_2$ corresponding to that necessary to obtain a conversion of said alkylphenol into alkylsalicylate expressed as acid between approximately 5 and 50%, to form a second product;
   c. in a sulfurization-superalkalinization stage, sulfurizing said second product obtained with elemental sulfur in the presence of an alkaline earth base, an alkylene glycol and an azeotropic solvent selected from the group consisting of (1) the aromatic hydrocarbons, (2) the aliphatic hydrocarbons, and (3) the monoalcohols with a boiling point greater than 120° C. and preferably greater than 150° C., at a temperature of about 140° to 230° C., the quantities of reagents used corresponding to the following molar ratios;
   sulfur/alkylphenol ranging from 0.7 to 1.5, alkaline earth base/alkylphenol of at least 1.7,
   superalkalinization alkaline earth base/alkylene glycol ranging from 1 to 1.6, to form a third product and
   carboxylating said third product with a quantity of carbon dioxide at a temperature of 100°-185° C. and under about atmospheric pressure, said quantity of $CO_2$ being between that amount of $CO_2$ which is completely absorbed by the reaction medium and a 30% excess of said amount;
   d. eliminating the alkylene glycol and the azeotropic solvent after addition of dilution oil;
   e. filtering; and
   f. collecting the product of the process.

2. Process according to claim 1 wherein the quantities of reagents used in the first stage correspond to the following molar ratios:
   alkaline earth base/alkylphenol ranging from 0.3 to 0.7,
   acid/alkylphenol ranging from 0.05 to 0.2.

3. Process according to claim 1 wherein the acid used in the first stage is a $C_1$-$C_3$ carboxylic acid.

4. Process according to claim 1 wherein the acid used in the first stage is a mixture of formic acid and acetic acid having an acetic acid/formic acid molar ratio ranging from 0.01/1 to 5/1.

5. Process according to claim 1 or 2 wherein the sulfurization-super alkalinization stage is replaced by the following sequential stages:
   sulfurizing said second product with elemental sulfur in the presence of an alkali metal hydroxide as catalyst at a temperature between 140° and 230° C., and an azeotropic solvent forming an azeotrope with said water selected from the group consisting of (1) the aliphatic hydrocarbons, (2) the aromatic hydrocarbons and (3) the monoalcohols with a boiling point above 120° C., and the quantities of reagents used corresponding to the following molar ratios:
   sulfur/alkylphenol ranging from 0.7 to 1.5, preferably from 0.7 to 1.3,
   alkali hydroxide/alkylphenol ranging from 0.01 to 0.03, to form a sulfurized said second product;
   superalkalinizing the sulfurized said second product by addition of an alkaline earth base at a temperature of 50° to 80° C. in the presence of an alkylene glycol and an azeotropic solvent forming an azeotrope with said water selected from the group consisting of (1) the aliphatic hydrocarbons (2) the aromatic hydrocarbons, and (3) the monoalcohols with a boiling point above 120° C., the quantities of reagents used corresponding to the following molar ratios:
   alkaline earth base/alkylphenol of at least 1.7,
   superalkalinization alkaline earth base/alkylene glycol ranging from 1 to 1.6, to form a third product, and
   carboxylating said third product with a quantity of carbon dioxide at a temperature of 100°-185° C., preferably 145° C. to 165° C. under about atmospheric pressure, said quantity of $CO_2$ being between that amount of $CO_2$ which can be completely absorbed by the reaction medium and an excess of 30% of said amount.

6. Process according to claim 1 wherein the quantities of reagents used in the sulfurization-superalkalinization stage correspond to the following molar ratios:

sulfur/alkylphenol ranging from 0.7 to 1.3, and alkaline earth base/alkylphenol ranging from 1.7 to 2.

7. Process according to claim 1 or claim 5 wherein the alkaline earth base is calcium hydroxide or calcium oxide.

8. Process according to claim 1 or claim 5 wherein the azeotropic solvent is 2-ethylhexanol, cyclohexane or xylene.

9. Process according to claim 5 wherein the alkali metal hydroxide used in the sulfurization stage is potash or soda.

* * * * *